(12) United States Patent
Lauter et al.

(10) Patent No.: US 11,002,341 B2
(45) Date of Patent: May 11, 2021

(54) DRIVE DEVICE AND METHOD FOR SPEED LIMITATION

(71) Applicant: VOITH PATENT GMBH, Heidenheim (DE)

(72) Inventors: Bernd Lauter, Sontheim an der Brenz (DE); Jochen Lindenmaier, Herbrechtingen (DE)

(73) Assignee: Voith Patent GmbH, Heidenheim (DE)

( * ) Notice: Subject to any disclaimer, the term of this patent is extended or adjusted under 35 U.S.C. 154(b) by 191 days.

(21) Appl. No.: 16/321,116

(22) PCT Filed: Jul. 14, 2017

(86) PCT No.: PCT/EP2017/067836
§ 371 (c)(1),
(2) Date: Jan. 28, 2019

(87) PCT Pub. No.: WO2018/019616
PCT Pub. Date: Feb. 1, 2018

(65) Prior Publication Data
US 2019/0170222 A1   Jun. 6, 2019

(30) Foreign Application Priority Data
Jul. 26, 2016   (DE) .................... 10 2016 213 639.9

(51) Int. Cl.
*F16H 3/72* (2006.01)
*F16H 61/12* (2010.01)
(52) U.S. Cl.
CPC ....... *F16H 3/727* (2013.01); *F16H 2061/122* (2013.01); *F16H 2200/2005* (2013.01)
(58) Field of Classification Search
CPC ............. F16H 3/72; F16H 61/12; F16H 3/727
See application file for complete search history.

(56) References Cited

U.S. PATENT DOCUMENTS

| 5,558,589 | A | 9/1996 | Schmidt |
|---|---|---|---|
| 2009/0010094 | A1 | 1/2009 | Uemura |

(Continued)

FOREIGN PATENT DOCUMENTS

| DE | 102014210864 A1 | 12/2015 |
|---|---|---|
| FR | 2911539 A1 | 7/2008 |
| WO | 2016172742 A1 | 11/2016 |

OTHER PUBLICATIONS

Klaus Peter et al.: "Intelligenter thermischer Motorschutz", Elektromotoren, Neuentwicklung, antriebstechnik Dec. 2009 pp. 34-39, htt://www.hs-regensburg.de/fileadmin/media/professoren/ei/seifert/pdf-Artikel/Intelligenter_Temperaturschutz.pdf [found on the Internet Jul. 19, 2017]—English abstract.

(Continued)

*Primary Examiner* — Derek D Knight
(74) *Attorney, Agent, or Firm* — Laurence A. Greenberg; Werner H. Stemer; Ralph E. Locher

(57) ABSTRACT

A drive device includes a superposition transmission, a main drive machine connected to an input shaft of the transmission, auxiliary drives and an output shaft of the transmission connectable to a work machine. The transmission has a planetary transmission with an internal gear, sun gear, planet carrier and planet gears. The input shaft is connected to the internal gear, the output shaft is connected to the sun gear, and the auxiliary drives are connected by a first transmission stage with constant transmission ratio to the planet carrier. An auxiliary drive connection with constant transmission ratio is between the auxiliary drive and the internal gear or a pinion on the input shaft. A switchable clutch in the auxiliary drive connection can activate or interrupt the auxiliary drive connection, so that upon interruption, the connection between auxiliary drive and planet carrier (Continued)

remains activated by the clutch through the first transmission stage.

18 Claims, 7 Drawing Sheets

(56) References Cited

U.S. PATENT DOCUMENTS

2018/0126836 A1* 5/2018 Waldner .................. H02P 5/753
2018/0309347 A1* 10/2018 Kusserow ............. B66B 11/043

OTHER PUBLICATIONS

Randy Wilson: "Gängige Methoden für die Kühlung oder Wärmeableitung bei Elektromotoren" Kollmorgen Sep. 19, 2014, pp. 1-3, http://www.kollmorgen.com/de-de/blogs/_blog-in-motion/articles/randy-wilson [found on the Internet Jul. 19, 2017]—English abstract.

* cited by examiner

DRIVE DEVICE AND METHOD FOR SPEED LIMITATION

BACKGROUND OF THE INVENTION

Field of the Invention

The invention relates to a drive device comprising a superposition transmission, a main drive machine which is connected to an input shaft of the superposition transmission, one or more auxiliary drives and an output shaft, which output shaft can be connected to a work machine, wherein the superposition transmission has a planetary transmission with an internal gear, a sun gear, a planet carrier and multiple planet gears, and wherein the input shaft is connected to the internal gear, the output shaft is connected to the sun gear, and the one or more auxiliary drives are connected by means of a transmission stage to the planet carrier.

The invention also relates to a method for rotational speed limitation in the event of a failure or fast shutdown of the main drive machine or of an auxiliary drive on a drive device of said type.

In the case of a superposition transmission, in general, two shafts of the planetary transmission are driven by mutually independent drives such that the rotational speeds are added or subtracted at the third shaft, the output shaft. If one of the drives is controllable, it is then thus possible to realize continuously variable speed control for the output shaft.

From the prior art, drive devices having a superposition transmission are known in which a main drive machine drives the internal gear of a planetary transmission via the input shaft, and a controllable auxiliary drive drives the planet carrier via a transmission stage, whereas the drive machine is connected via the output shaft to the sun gear. By means of such a drive device, the rotational speed at the output shaft can be adjusted in continuously variable fashion over an extremely large rotational speed range, this being possible with a main drive machine which runs at constant rotational speed.

It is furthermore possible for the main drive to be crank-started without load by virtue of the auxiliary drive imparting in each case the rotational speed of the main drive machine during the run-up. Only when the main drive is in the vicinity of the setpoint rotational speed, and can thus impart a high torque, is the load slowly accelerated by virtue of the compensation of the rotational speed by means of the auxiliary drive being reduced.

A specific embodiment is presented for example in the document DE 102014210864 A1. Here, a clutch is now additionally provided between auxiliary drive and the first transmission stage to the planet carrier. This clutch makes it possible for the auxiliary drive to be completely separated from the planetary transmission. In this way, in the event of a fault of the auxiliary drive, the latter can be immobilized, and the remainder can continue to be operated at least with the main drive machine at constant rotational speed.

Such drive devices are used in particular for driving pumps, compressors or supercharging blowers with high power, such as are used for example in the oil and gas industry or in thermal power plants.

Here, however, the problem that the auxiliary drive and the transmission can be damaged if the main drive machine fails during operation or must be isolated from the network is not satisfactorily solved. Since, in the usage situations mentioned above, the inertia of the main drive machine is normally much greater than that of the driven work machine, the rotational speed of the work machine will quickly decrease to zero in the event of a failure of the drive torque at the main drive machine. In the case of this transmission variant, owing to the rotational speed equilibrium at the planetary transmission, the planet carrier and the auxiliary drive will be greatly accelerated. Here, inadmissible rotational speeds can occur at the planet carrier. This cannot be prevented by means of the clutch at the auxiliary drive, and it is even the case that, although the auxiliary drive can be protected by means of the disengagement of the clutch, the rotational speed of the planet carrier would however then rise even more quickly. In the prior art, it is proposed to prevent this by means of a brake at the planet carrier, which however necessitates yet another additional component in addition to the clutch. This increases the costs of the drive device and requires more structural space—two severe disadvantages.

SUMMARY OF THE INVENTION

It is now the object of the invention to find an improved solution for the abovementioned problem.

For the device, the object is achieved by means of a drive device comprising a superposition transmission, a main drive machine which is connected to an input shaft of the superposition transmission, one or more auxiliary drives and an output shaft of the superposition transmission, which output shaft can be connected to a work machine, wherein the superposition transmission has a planetary transmission with an internal gear, a sun gear, a planet carrier and multiple planet gears, and wherein the input shaft is connected to the internal gear, the output shaft is connected to the sun gear, and the one or more auxiliary drives are connected by a first transmission stage with constant transmission ratio to the planet carrier. Further advantageous features of the embodiment according to the invention, which further improve the device, can be found in the corresponding subclaims. Here, the device is further developed such that an auxiliary drive connection with constant is provided between the auxiliary drive at one side and the internal gear or a pinion on the input shaft on the other side, wherein, in this auxiliary drive connection, there is provided a switchable clutch which can activate or interrupt the auxiliary drive connection, in such a way that, in the event of interruption by means of the clutch, the connection between auxiliary drive and planet carrier remains activated via the first transmission stage. Here, "activated" means that power and torque can be transmitted. It is thus possible by means of the clutch for the auxiliary drive and the main drive machine to be directly coupled on the input side of the planetary transmission by means of the auxiliary drive connection. With suitable selection of the transmission ratio for the auxiliary drive connection, it is possible, in the event of failure of the main drive, for a major part of the energy in the clutch to be dissipated through the acceleration of the auxiliary drive in the opposite direction. With suitable delayed activation of the clutch, it is possible for a greater part of the energy to also be dissipated in the auxiliary drives, such that the clutch can be designed to be smaller and lighter. An overspeed of the auxiliary drive or of the planet carrier is thus prevented in an effective manner. Thus, in particular, the planet journals are protected against damage owing to excessively high centrifugal forces.

With suitable activation of the clutch, such that the greatest possible amount of energy is dissipated in the auxiliary drive and little energy is dissipated in the clutch, the generation of heat in the drive device can be kept low.

This is a particular advantage in relation to the known variant with a brake, in particular if for example usage situations in explosive environments are planned, for example compressors in the oil and gas industry or fans in the environments with combustible dusts. Particular temperature limits are often predefined there, which must not be exceeded even in the event of a fault.

During normal operation, the clutch is open and the auxiliary drive connection is interrupted. The auxiliary drives are connected by means of the auxiliary drive shafts and the first transmission stage to the planet carrier. In the event of a fault, the clutch is closed as described above, and the auxiliary drive connection is activated.

The arrangement is well-suited to high rotational speeds at the output, such as are required for example in the case of fast-running supercharging blowers or in the case of large fans, because in this way the structural space and the weight of the drive device can be kept relatively small or low.

In the arrangement according to the invention, there is additionally the advantage that, when the clutch is closed, the drive device can drive the work machine by means of the auxiliary drive alone, that is to say with the main drive machine electrically deenergized. This is not possible with the hitherto known devices. The advantage consists inter alia in that, in this way, in the low rotational speed range, the work machine can be operated by means of the auxiliary drives alone. If the rotational speed at the input shaft enters the range of the setpoint rotational speed of the main drive machine, the latter can be connected to the electrical network. It is thus possible for the duration of the undesired activation current peaks to be considerably reduced.

A transmission stage is to be understood to mean a drive connection which transmits power and torque with a constant transmission ratio, that is to say a fixed rotational speed ratio. The first transmission stage is formed preferably by a single-stage spur-gear transmission between a toothed gear on the auxiliary drive shaft and the planet carrier, which is designed as a toothed gear or which bears a toothed gear joined thereto. Said first transmission stage is particularly preferably formed as a so-called gear train, that is to say is composed of several, at least two, gear wheels, which are in engagement with one another in series and thus transmit the torque to the toothed gear on the planet carrier. Alternatively, the first transmission stage may also be formed by a multistage adaptation transmission or a chain drive or a toothed-belt drive.

The auxiliary drive connection may likewise preferably be designed as a single-stage spur-gear transmission composed of a toothed gear on the auxiliary drive shaft and an external toothing on the internal gear or an additional pinion on the input shaft. The design variants mentioned in the case of the first transmission stage can also advantageously be used in the auxiliary drive connection, in particular the gear train. The required clutch is provided preferably between the auxiliary drive shaft and the toothed gear on the auxiliary drive shaft. Thus, when the clutch is open, the one or more toothed gears of the auxiliary drive connection do not have to be moved conjointly, which can be advantageous. In the variant with an additional pinion on the input shaft, the clutch may alternatively be provided between the pinion and the input shaft.

The auxiliary drive connection may be formed by a second transmission stage, wherein the auxiliary drive connection acts from an auxiliary drive shaft via the second transmission stage directly on the internal gear or the pinion. Said auxiliary drive connection may also be formed by a second and a third transmission stage, wherein the second transmission stage firstly transmits torque from the auxiliary drive shaft to an intermediate shaft, and the third transmission stage transmits torque from the intermediate shaft to the pinion or to the input shaft or to the internal gear. Alternatively, the auxiliary drive connection is formed such that torque is transmitted from an auxiliary drive shaft via a first transmission stage to the planet carrier, via a second transmission stage from the planet carrier to an intermediate shaft, and via a third transmission stage from the intermediate shaft to the internal gear or the pinion. It is preferably possible here for the first transmission stage and/or the third transmission stage to be constructed as gear trains composed of in each case at least two toothed gears in addition to the toothed gear or pinion to which the torque is to be transmitted. The clutch may preferably be provided between second and third transmission stage, and divide the intermediate shaft into a first and a second intermediate shaft. This permits a particular structural-space-saving version and a housing with a parting joint.

The inventive embodiment is particularly advantageous if the main drive machine is operable only at a constant rotational speed, and the one or more auxiliary drives are operable with rotational speed control, and in particular, the one or more auxiliary drives are designed as low-voltage motors. A major part of the drive power can be imparted by the main drive machine operated at constant rotational speed. Said main drive machine does not require any frequency transformer, which saves investment costs. The main drive machine is preferably designed as a medium-voltage motor, that is to say with a voltage of greater than 1 kV. The rotational speed control is realized by means of the auxiliary drives, which require less power and which are preferably designed as low-voltage motors with a voltage of less than 1 kV. The frequency transformers required for these are thus relatively small and relatively inexpensive.

To reduce an inadmissible temperature increase at the auxiliary drives and in order to be able to access the power, that is to say the torque, thereof even at low rotational speed, it is advantageous if the one or more auxiliary drives have in each case one external cooler, which is designed as an external fan with separate fan motor and which in particular has a sensor for monitoring the winding temperature at the separate fan motor. The fans used in the prior art, which are seated on the motor shaft and rotate conjointly with the motor rotational speed, are not sufficient for this purpose. With an external cooler, the cooling power can be controlled independently of the rotational speed of the auxiliary drive.

Alternatively, the one or more auxiliary drives may have in each case one external cooler, which is designed as a water-type cooler and which in particular has a sensor for monitoring the cooling water temperature in the cooler return line and/or a sensor for monitoring the cooling water pump. In this way, too, independent control of the cooling power is possible. As cooling water, use may be made of any suitable liquid coolant.

The additional sensors permit a detection of the cooling power and thus a detection of the load of the auxiliary drive. These data can be utilized for the control of the drive device as a whole, and also for the predictive detection of faults.

The clutch is particularly advantageously designed such that, in the non-activated state, in particular in the event of an energy failure, it moves into the closed state, and that the clutch is preferably designed as a multiplate clutch or dog clutch or viscous coupling. By means of the clutch being designed so as to be closed when electrically deenergized, it is ensured that the protection against overspeeding is realized even in the event of a complete energy failure. Multiplate clutches, dog clutches or viscous couplings or hydrodynamic clutches are particularly well-suited to transmitting high power.

In order to permit a delayed switching of the clutch in targeted fashion, the correct switching time must be determined. For this purpose, it is necessary to detect the rotational speeds at the drive device. It is therefore advantageous if said drive device is designed such that, of the three rotational speeds (n1, n2, n3): main drive machine, output shaft and auxiliary drive, at least two rotational speeds can be detected or measured. The third required rotational speed at the planetary transmission can be determined by means of the rotational speed equations (Willis equations). The detection or measurement may be performed in particular by means of pulse generators at the drive and/or rotational speed sensors.

To be able to predictively detect the load and possibly an impending fault, it is advantageous if the one or more auxiliary drives have a sensor for detecting the winding temperature and/or a sensor for detecting the bearing temperature. Such an embodiment is preferable in particular in the case of high demands being placed on the temperature limitation in the drive arrangement. Furthermore, for the same reasons, the main drive machine may have a sensor for detecting the winding temperature and/or a sensor for detecting the bearing temperature.

For the method, the object is achieved by a method for rotational speed limitation on a drive arrangement according to the invention in the event of failure or fast shutdown of the main drive machine or of an auxiliary drive, wherein the following method steps are performed:

a) detecting a failure or a fast shutdown of the main drive machine or of an auxiliary drive; and s) subsequently closing the clutch.

Further advantageous features of the method according to the invention, which further improve said method, can be found in the corresponding subclaims.

The following method steps are performed on a drive device according to the invention in order to prevent an undesired overspeed at the auxiliary drive and at the planet carrier:

A) detecting a failure or a fast shutdown of the main drive machine or of an auxiliary drive;

S) and subsequently closing the clutch.

As a result of the closing of the clutch after detection of a fault, the main drive machine and auxiliary drives are fixedly coupled to one another by means of the second spur-gear stage. The auxiliary drives and the planet carrier are thus prevented here from being overly intensely accelerated owing to the high inertia of the main drive machine. The risk of damage owing to excessively high rotational speeds is avoided.

The detection of a failure or of a fast shutdown, wherein this also encompasses an impending failure or an impending fast shutdown, may be performed for example by means of the drive controller and/or by means of signals from the electrical supply, in particular in the event of failure of the supply network or triggering of safety devices or emergency-off devices. Error or fault messages may likewise be used.

Closing of the clutch is to be understood to mean the switching time of the activation of the clutch. After the activation, there is initially a phase in which a certain amount of slip prevails at the clutch, before substantially complete torque transmission is then attained.

To further improve the rotational speed limitation and reduce the loading of the clutch, it is advantageous if the following steps are additionally performed:

B) repeatedly determining or measuring the rotational speeds at one of the auxiliary drives or the planet carrier, at the input shaft or the main drive machine and at the output shaft or the drive machine;

C) calculating the synchronization point from the condition: rotational speed (n2) of the main drive machine before the closing of the clutch is equal to the rotational speed (n2) after the closing of the clutch;

S1) immediately closing the clutch only if the rotational speed (n3) of the auxiliary drive is moving away from the synchronization rotational speed (n_syn), S2) otherwise closing the clutch with a delay, specifically when the rotational speed (n3) of the auxiliary drive deviates from the synchronization rotational speed (n_syn) at most by 5%, preferably at most by 3%.

For process reasons, some steps may be performed entirely or partially in parallel. In particular, steps B) and C) may be performed in parallel. Alternatively, step B) may also be performed continuously during operation. The steps S1) and S2 are to be regarded as a distinction of cases, and as a more detailed rendering of step S): if the condition "rotational speed (n3) of the auxiliary drive is moving away from the synchronization rotational speed", then step S1) is implemented. By contrast, if the condition is not met, then S2) is implemented instead.

To be able to determine the rotational speeds of the two drive shafts and of the output shaft, it is necessary for at least two of the rotational speeds to be measured. The third can then be determined by means of the so-called Willis equation. The measurement may be performed by means of rotational speed sensors at suitable locations or by means of pulse generators at the drives. In the case of the constantly driven main drive motor, it is possible, with a certain curtailment in accuracy and even in the event of a fault, to assume as an approximation that the rotational speed is initially constant, then even one rotational speed measurement is sufficient.

The Willis equation for the rotational speed equilibrium when the clutch is open reads as follows:

$$n1 - (i\_PG * n2) - ((1 - i\_PG) * (n3/i\_SG1)) = 0 \qquad \text{(Eq. 1)}$$

The labeling of the rotational speeds and transmission ratios can be found in the list of reference designations relating to the figures.

For the calculation of the synchronization point, the condition that the rotational speed (n2) at the main drive machine is equal before and after the closing of the clutch must be satisfied. Whereas the Willis equation specifies the condition when the clutch is open, the following equation specifies the condition when the clutch is closed:

$$n2 = n3/i\_SG2 \qquad \text{(Eq. 2a)}$$

Both equations must be satisfied simultaneously at the synchronization point. If this is the case, the clutch can be closed with minimal slippage. By means of the transmission ratio i_SG2, the rotational speed of the auxiliary drive at the synchronization point is predefined as a function of the rotational speed of the main drive machine. By inserting Eq. 1 into Eq. 2, the condition can be expressed not only for n2 and n3 but alternatively also as a function of the other rotational speeds. The selection of the transmission ratio i_SG2 is selected such that the rotational speed at the synchronization point lies in the control range of the drive device.

In an embodiment with an auxiliary drive connection which acts from the auxiliary drive via the first transmission stage on the planet carrier and from there via a second transmission stage on an intermediate shaft and from there via a third transmission stage on the internal gear or on the pinion on the input shaft, the following equation for the condition when the clutch is closed applies instead of equation (2a):

$$n2 = n3*(i\_SG3*i\_SG2/i\_SG1) \tag{Eq. 2b}$$

Now, if a failure is detected, the present rotational speeds are compared with the rotational speed at the synchronization point. If the rotational speed of the auxiliary drive is moving away from its synchronization rotational speed, then the clutch is immediately closed, and the auxiliary drive is fixedly coupled to the main drive machine. By contrast, if the rotational speed of the auxiliary drive is moving toward the synchronization rotational speed, then the closing of the clutch is delayed, specifically until the rotational speed of the auxiliary drive deviates from the associated synchronization rotational speed by no more than 5%, preferably by no more than 3%. It is achieved in this way that the energy consumption and thus the generation of heat in the clutch is as low as possible. The first case, with immediate closure of the clutch, is required only if the rotational speed of the auxiliary drive has already exceeded the synchronization rotational speed and can no longer attain said synchronization rotational speed without intervention.

In particular, it is advantageous if an impending failure or fast shutdown of the main drive machine (2) can be identified already before the onset thereof. For this purpose, it is for example possible for upper temperature limits for the winding temperature and/or for the bearing temperature of one or more drives to be monitored by means of one or more temperature sensors.

Furthermore, it is additionally possible for present acceleration values from the measured or determined rotational speeds (n1, n2, n3) to additionally be used for the detection of a failure or impending failure. It is thus possible, in the event of particular gradients occurring in the rotational speed, for a failure to be detected and for the method according to the invention for rotational speed limitation to be implemented.

It may be advantageous if, in the event of a failure or malfunction of the main drive machine, as a further method step, a rotational speed preset or torque preset is applied to the auxiliary drives in order to bring these into the vicinity of the synchronization rotational speed. In this way, it is possible to avoid the need for excessive energy to be absorbed in the clutch. The generation of heat in the clutch is thus reduced.

BRIEF DESCRIPTION OF THE SEVERAL VIEWS OF THE DRAWING

On the basis of exemplary embodiments, further advantageous configurations of the invention will be discussed with reference to the drawings. The stated features may not only be advantageously implemented in the illustrated combination but also individually combined with one another. In detail, in the figures.

DESCRIPTION OF THE INVENTION

The figures will be described in more detail below. The same reference designations are used to denote identical or analogous parts or components.

Figure 1:
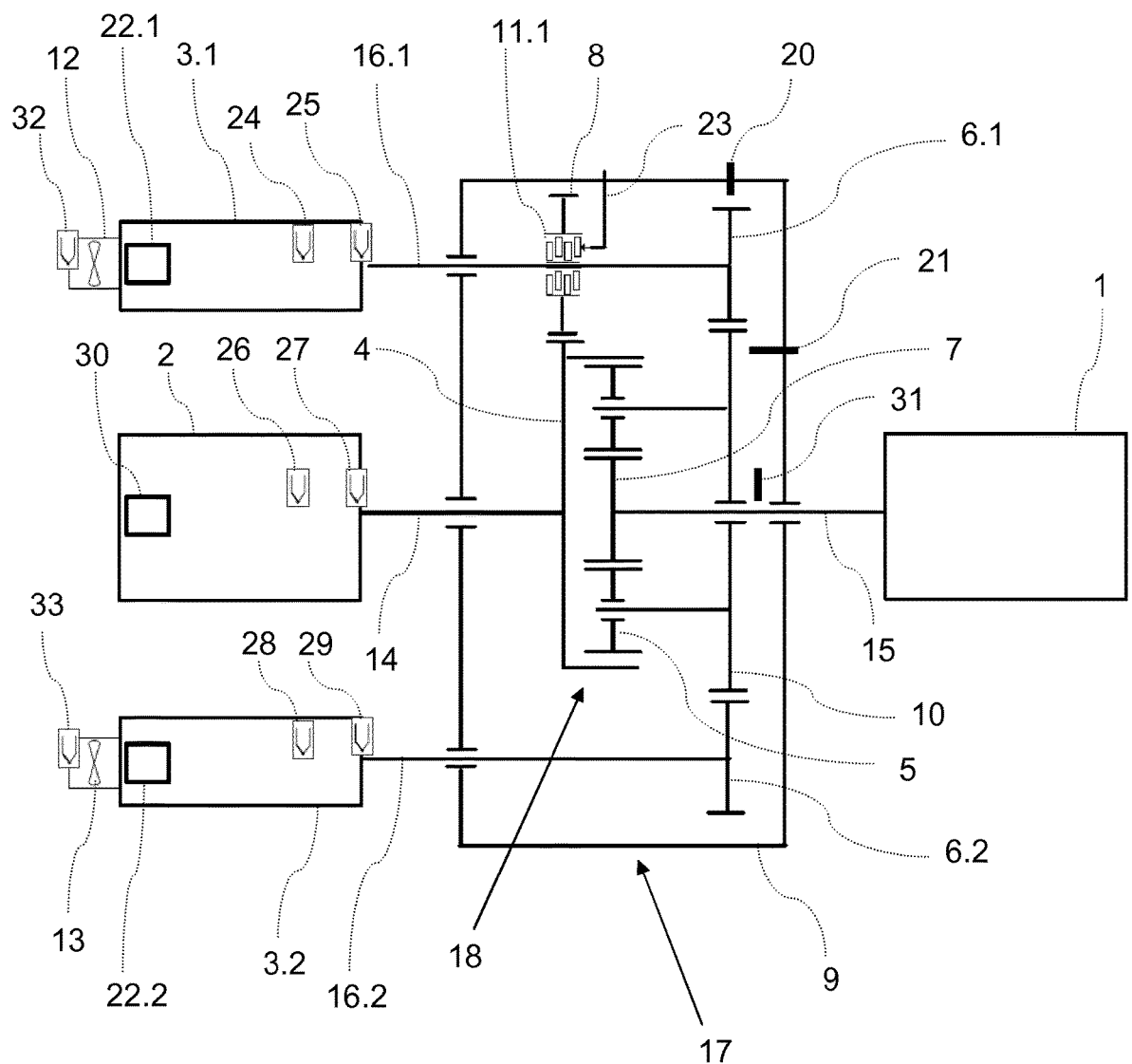
FIG. 1 shows a drive device according to the invention

FIG. 1 shows a drive device according to the invention which is connected by means of the output shaft 15 to the work machine 1. The method according to the invention for rotational speed limitation can be advantageously used also on a device of said type. The superposition transmission 17 has a housing 9 and comprises a planetary transmission 18 with the transmission ratio i_PG. The input shaft 14 connects the main drive machine 2 to the internal gear 4 of the planetary transmission, and the output shaft 15 connects the sun gear 7 to the work machine 1. The third shaft of the superposition transmission is formed by the auxiliary drive shafts 16.1 and 16.2. These connect the auxiliary drives 3.1 and 3.2 via the first transmission stage 6.1, 6.2 to the planet carrier 10. The planet carrier 10 firstly bares the planet gears 5 by means of the planet journals, and on the other side is formed as a toothed gear, which together with the respective toothed gears on the auxiliary drive shafts 16.1 and 16.2 forms the first transmission stage 6.1, 6.2. The toothed gear on the planet carrier may also be joined, and need not imperatively be formed in one piece with the planet carrier. This figure illustrates the preferred variant for the transmission stage, specifically in the form of a spur gear stage. Furthermore, this embodiment is equipped with two auxiliary drives 3.1 and 3.2; the invention may however also be implemented with only one auxiliary drive or with multiple, for example three, auxiliary drives. It is important that the auxiliary drives are coupled by means of a transmission stage 6.1, 6.2 with equal transmission ratio to the planet carrier 10.

The auxiliary drives 3.1, 3.2 are designed as controllable motors of low power, and the main drive machine 2 is designed as a motor with relatively high power but constant rotational speed. The auxiliary drives may preferably be designed as low-voltage motors, because they often exhibit only approximately 10 to 30% of the overall drive power. Thus, the required frequency transformers and the other components for control purposes are also relatively small and relatively inexpensive. The main drive machine 2 is, in many applications, designed as a medium-voltage motor in order to provide the required power overall, and may be implemented without control means. Such drive devices are of particular interest in the case of high levels of power of several MW, such as are encountered in the case of high-speed pumps, supercharging blowers or fans in the oil and gas industry or in thermal power plants. By means of the rotational speed and direction of rotation of the auxiliary drives 3.1, 3.2, the rotational speed at the output shaft 15 can be increased or decreased by a certain amount.

The limits of this range in the case of maximum rotational speed of the auxiliary drives 3.1, 3.2, on the one hand in a positive direction of rotation and on the other hand in a negative direction of rotation, predefine the possible control range. The transmission ratio i_SG1 of the first transmission stage 6.1, 6.2 must be adapted to the setpoint rotational speed ratios and torque ratios between auxiliary drive and main drive.

By means of a second transmission stage 8, which is in turn formed here as a spur gear stage by a further toothed gear of the auxiliary drive shaft 16.1 and the external toothing on the internal gear 4, the auxiliary drives 3.1, 3.2 can be coupled directly, bypassing the planetary transmission 18, to the input shaft 14 and to the main drive machine 2. This power path constitutes the auxiliary drive connection, which acts in addition to the connection that exists between the auxiliary drives 3.1, 3.2 and the planet carrier 10. This auxiliary drive connection can be opened or closed by means of the switchable clutch 11.1 using the actuator 23. The transmission ratio i_SG2 of the second transmission stage must be configured such that the rotational speed at the synchronization point lies in the control range. Even when the clutch is open, the connection between auxiliary drive 3.1, 3.2 and planet carrier 10 via the first transmission stage 6.1, 6.2 remains activated.

If one of the drives 2, 3.1, 3.2 now fails owing to a fault, or if a fast shutdown, in particular of the main drive 2, is initiated, then the rotational speed n1 at the work machine falls rapidly, because its inertia in these usage situations is very much smaller than that of the drive motors 2, 3.1, 3.2. Since the inertia of the auxiliary drives 3.1, 3.2 is also smaller than that of the main drive machine 2, the planet carrier 10 and the auxiliary drives 3.1, 3.2 are accelerated in the event of a fault, owing to the rapid run-down of the work machine 1 and the slow run-down of the main drive machine 2. Here, if an inadmissibly high rotational speed is reached, the auxiliary drives 3.1, 3.2 and in particular the planet gears 5 and the journals thereof may be damaged. A more reliable design of the planetary transmission 18 with regard to this particular fault situation, or an additionally provided brake, would make the drive device unduly large and expensive.

By means of the closing of the clutch 11.1 after the detection of a corresponding fault situation, this overspeed can be prevented in the system according to the invention. Information relating to the detection of a fault situation may originate for example from the control system or from the system of the energy supply. It is additionally possible for temperature sensors for bearing monitoring 25, 27, 29 or for monitoring the winding temperature 24, 26, 28 at the drive motors to be provided, the signal of which is used for the detection of a fault or of an impending fault. At the auxiliary drives, there are provided external coolers which are designed in this case as external fans 12, 13 with a dedicated fan motor and with monitoring sensors for the winding temperature 32, 33. The embodiment with an external cooler has the advantage that, even in the case of a low rotational speed of the auxiliary drive, a relatively high level of cooling power is possible, which can be controlled independently of the rotational speed of the auxiliary drive. This is necessary if a relatively high torque at relatively low rotational speed is demanded, which may arise not only during normal operation but also after the closing of the clutch 11.1 in the method described here for rotational speed limitation.

The clutch 11.1 and its activation means are implemented such that the clutch is closed in the event of a failure of the activation means. It is thereby ensured that, even in the event of a complete electrical failure and a failure of the controller, the rotational speed limitation is nevertheless achieved by means of the closed clutch.

Furthermore, rotational speed sensors 22.1, 22.2, 30 may be provided at the drives. Said rotational speed sensors may be formed by the pulse generators of the motors. Alternatively or in addition, a rotational speed sensor 20 may be provided at the toothed gear of the first transmission stage 6.1, 6.2, a rotational speed sensor 21 may be provided at the toothed gear of the planet carrier 10, and a rotational speed sensor 31 may be provided at the output shaft 15. Variants are thus specified with which all of the rotational speeds n1, n2, n3 and that of the planet carrier can be measured. It is however ultimately sufficient if two of these rotational speeds are measured, because the other rotational speeds can then be determined by means of the rotational speed equation of the planetary transmission 18 and by means of the transmission ratios. Therefore, not all of the rotational speed sensors shown are required simultaneously.

The determination of the rotational speeds and in particular the knowledge of the profiles thereof in the event of a fault offer the advantage that it can thus be determined when the best switching time for the clutch 11.1 is. By means of a delayed closing after the detection of a fault situation and an optimized switching time, the loading and the temperature increase in the clutch 11.1 during the shutdown of the system can be considerably reduced.

Figure 2A:
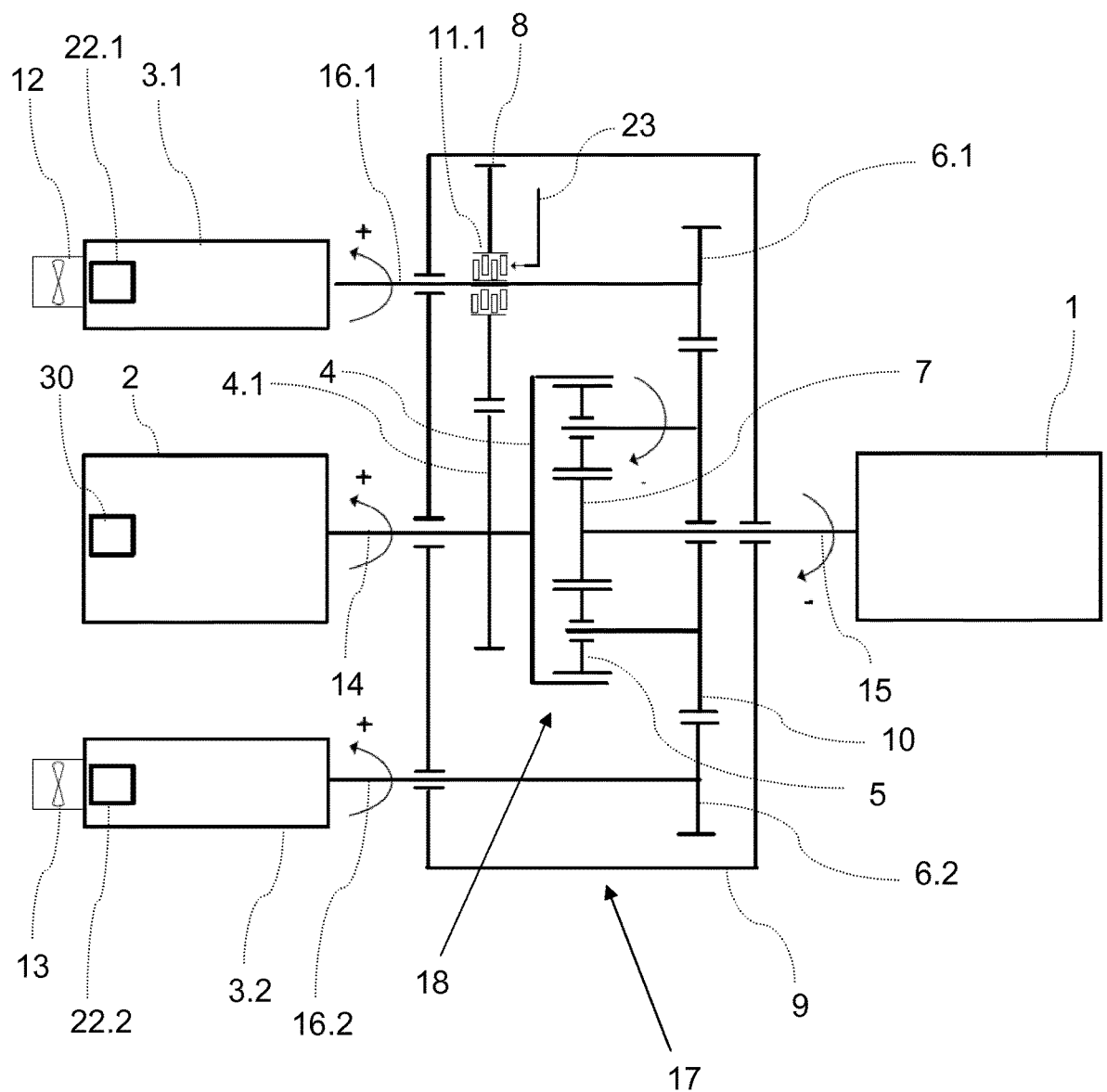
FIG. 2a shows a further drive device according to the invention with a positive rotational speed of the auxiliary drives
Figure 2B:
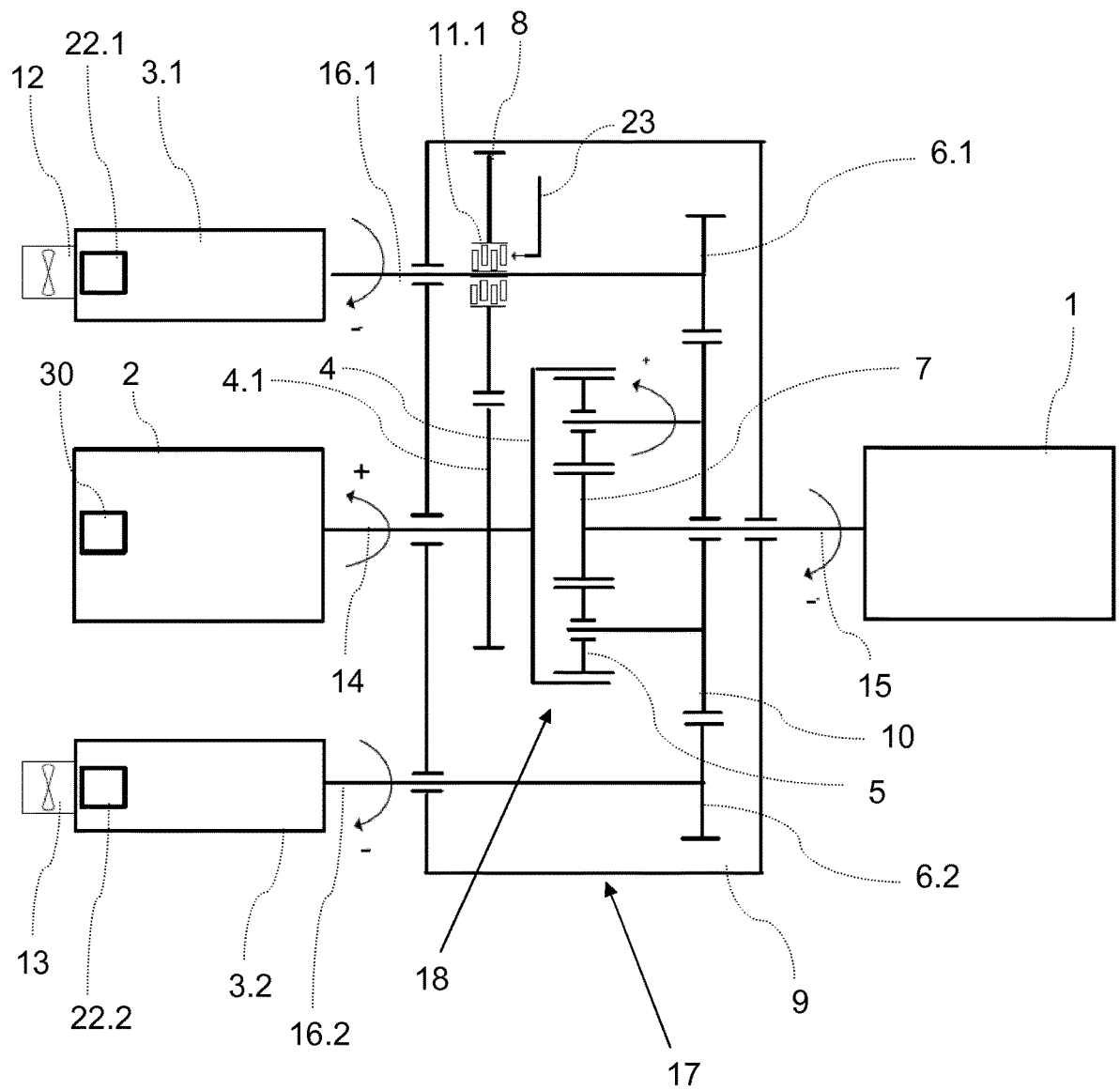
FIG. 2b shows a further drive device according to the invention with a negative rotational speed of the auxiliary drives

FIGS. 2*a* and 2*b* illustrate a further embodiment of a device according to the invention. The major difference in relation to the embodiment in FIG. 1 is that the second transmission stage 8 is not formed with an external toothing on the internal gear 4, but rather instead has a pinion 4.1 on the input shaft 14, which pinion is in engagement with the second toothed gear on the auxiliary drive shaft 16.1. The switchable clutch 11.1 is in turn illustrated between said second toothed gear and the auxiliary drive shaft 16.1. The clutch could however alternatively also be provided between the pinion 4.1 and the input shaft 14.

In this embodiment, too, the sensors mentioned with regard to FIG. 1 can be advantageously used.

By means of the arrows at the shafts, the direction of rotation (+/−) is indicated. In both cases, it is assumed that the clutch 11.1 is open. The direction of rotation of the output shaft 15 is always opposite to the direction of rotation of the input shaft 14. FIG. 2*a* describes operation above the reversal point, that is to say in this case the auxiliary drives increase the rotational speed at the output shaft 15 in relation to the rotational speed that would be realized, in the presence of the setpoint rotational speed of the main drive machine 2, if the planet carrier 10 and the auxiliary drives were static (=reversal point). FIG. 2*b* shows the situation in which the rotational speed of the work machine 1 is below the reversal point, that is to say the auxiliary drives reduce the rotational speed owing to the superposition.

Figure 3A:
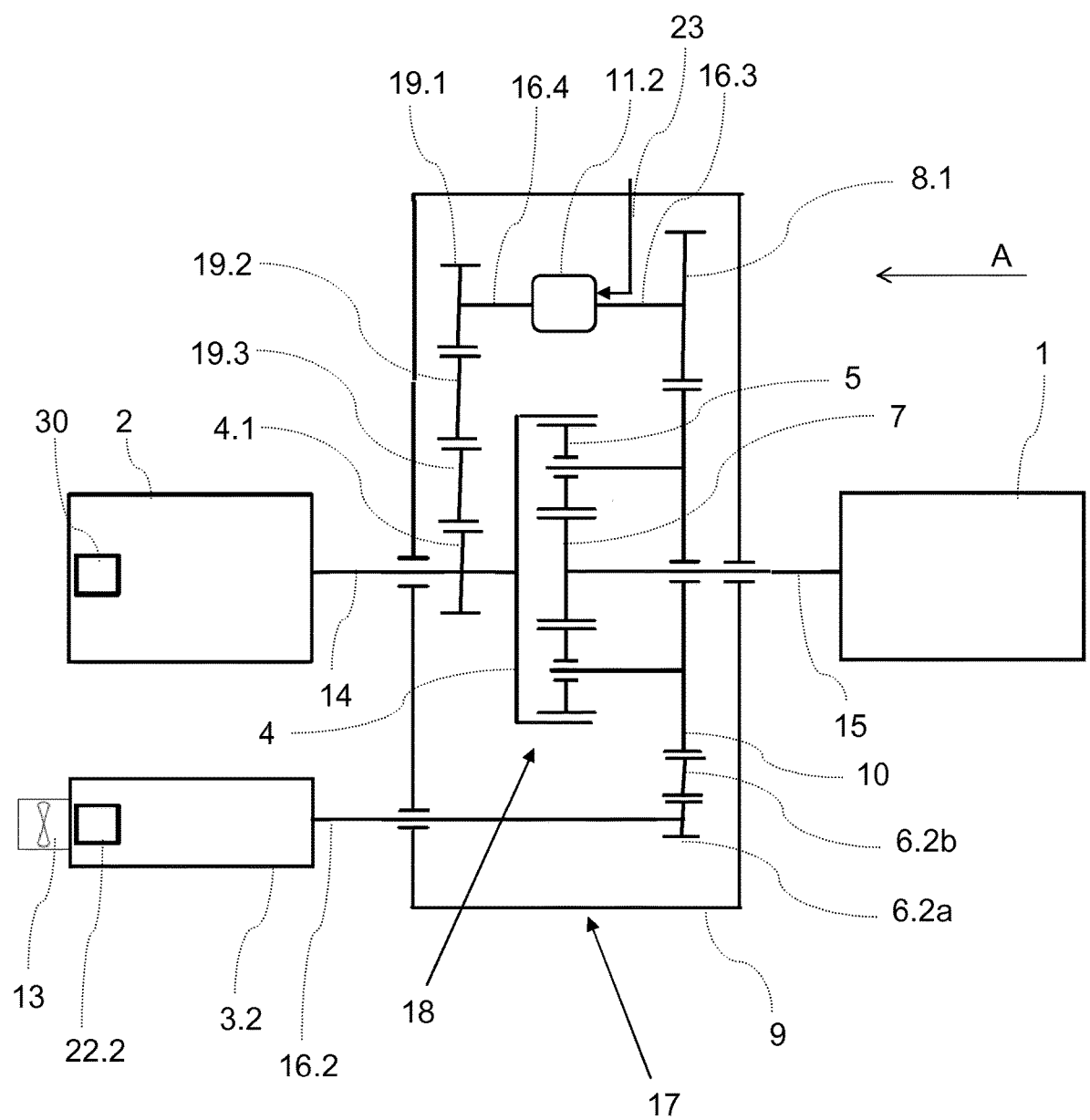
FIG. 3a shows a further drive device according to the invention with further drive connection via a gear train

FIG. 3*a* illustrates a further preferred embodiment of the inventive drive arrangement. For the sake of simplicity, only one auxiliary drive 3.2 is shown, but it is preferable for two or even three auxiliary drives to be analogously provided. Furthermore, the auxiliary drive 3.2 is shown schematically under the main drive machine 2, even though, in the case of two auxiliary drives, said auxiliary drive may preferably be situated in the same plane as the main drive machine 2. From the auxiliary drive 3.2, torque is transmitted by the first transmission stage, which is in the form of a gear train 6.2*a*,

6.2b, to the planet carrier 10. The auxiliary drive connection likewise utilizes this first transmission stage and then transmits the torque onward via the second transmission stage 8.1 to the first part of the intermediate shaft 16.3. By means of the switchable clutch 11.2, the first intermediate shaft 16.3 is connected to the second intermediate shaft 16.4. Then, from the intermediate shaft 16.4, the torque is transmitted by the third transmission stage, which in this case is designed as a gear train 19.1, 19.2, 19.3, to the pinion 4.1 on the input shaft 14. Thus, when the clutch 11.2 is closed, the auxiliary drive 3.2 is connected by means of the auxiliary drive connection via first, second and third transmission stage to the input shaft 14. When the clutch 11.2 is open, the auxiliary drive acts via the first transmission stage only on the planet carrier. The clutch 11.2 is actuated by means of the actuator 23. The equation (2b) applies for the calculation of the synchronization point.

Instead of one or both of the gear trains shown, use may also be made of in each case one spur-gear stage with relatively large toothed gears. Alternatively, one of the other stated variants may be used for the transmission of torque.

It is possible to clearly see the advantage that the design can be very compact and space-saving in terms of width in the region of the auxiliary drives 3.2 with the auxiliary drive shaft 16.2. This makes it possible, for example, for the drive arrangement according to the invention to be used in applications in a manner neutral in terms of structural space in relation to previous drive systems.

Figure 3B:
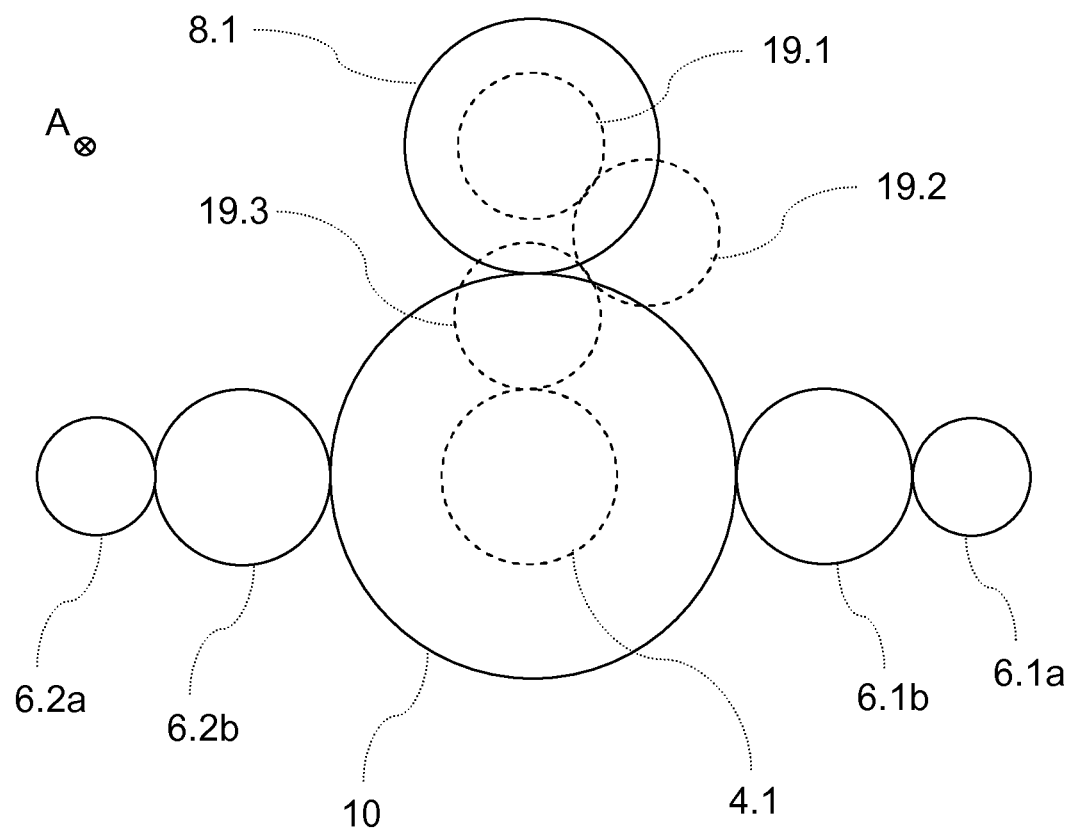
FIG. 3b shows a further drive device according to the invention with a further drive connection via a gear train as a detail in a frontal view

FIG. 3b shows a detail of the embodiment from FIG. 3a in a front view from the viewing direction A, wherein only the toothed gears are shown. Shafts and drives are not illustrated. A version with two auxiliary drives is shown. Via the gear trains 6.1a, 6.1b and 6.2a, 6.2b, which constitute the first transmission stage, torque is transmitted from the respective auxiliary drive shaft to the planet carrier 10. The second transmission stage 8.1 is in engagement with the planet carrier 10 and transmits the torque to the intermediate shaft. From there, when the clutch is closed, the torque is transmitted via the third transmission stage, which is in turn formed as a gear train 19.1, 19.2, 19.3, to the pinion 4.1 on the input shaft. It can be seen in this illustration that the transmission housing can be easily designed to be divided horizontally, because all of the shafts that have to extend through the housing can lie at one height. The bearing seats of the auxiliary drive shafts, of the input shaft and of the output shaft are correspondingly divided at one height by the parting joint.

Figure 4A:
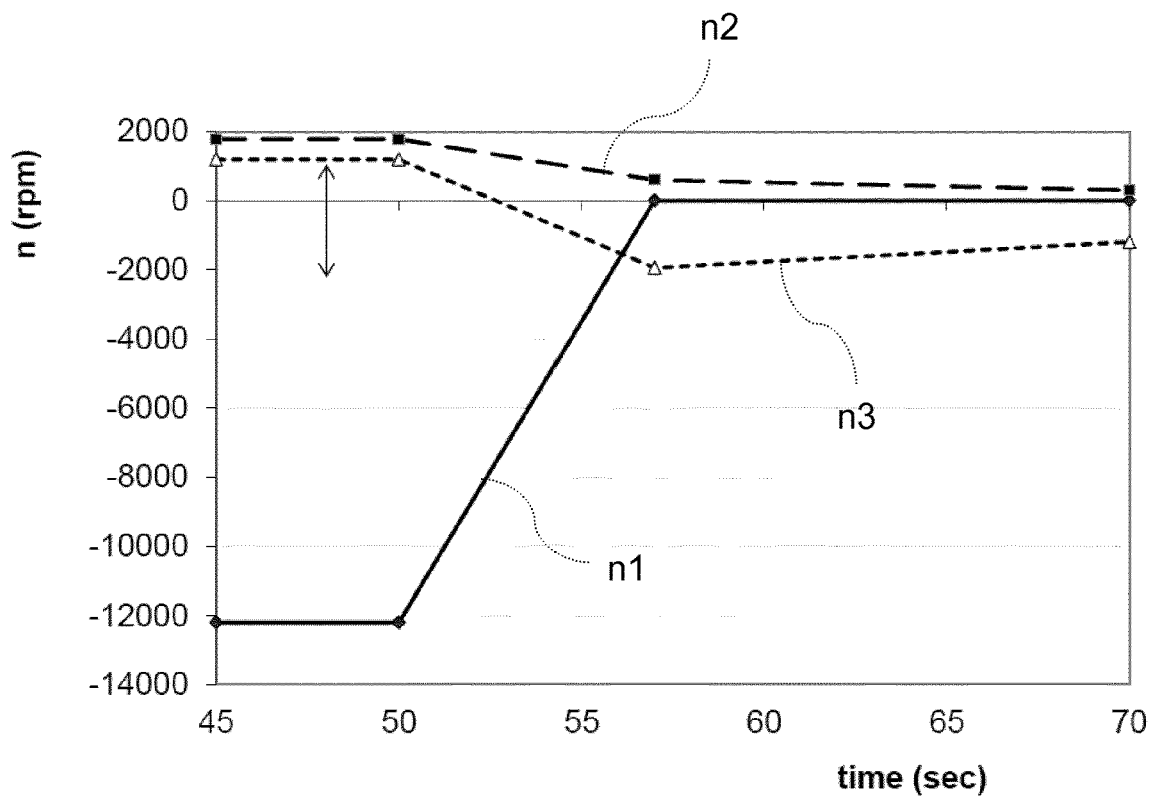
FIG. 4a shows an exemplary rotational speed profile without closing of the clutch
Figure 4B:
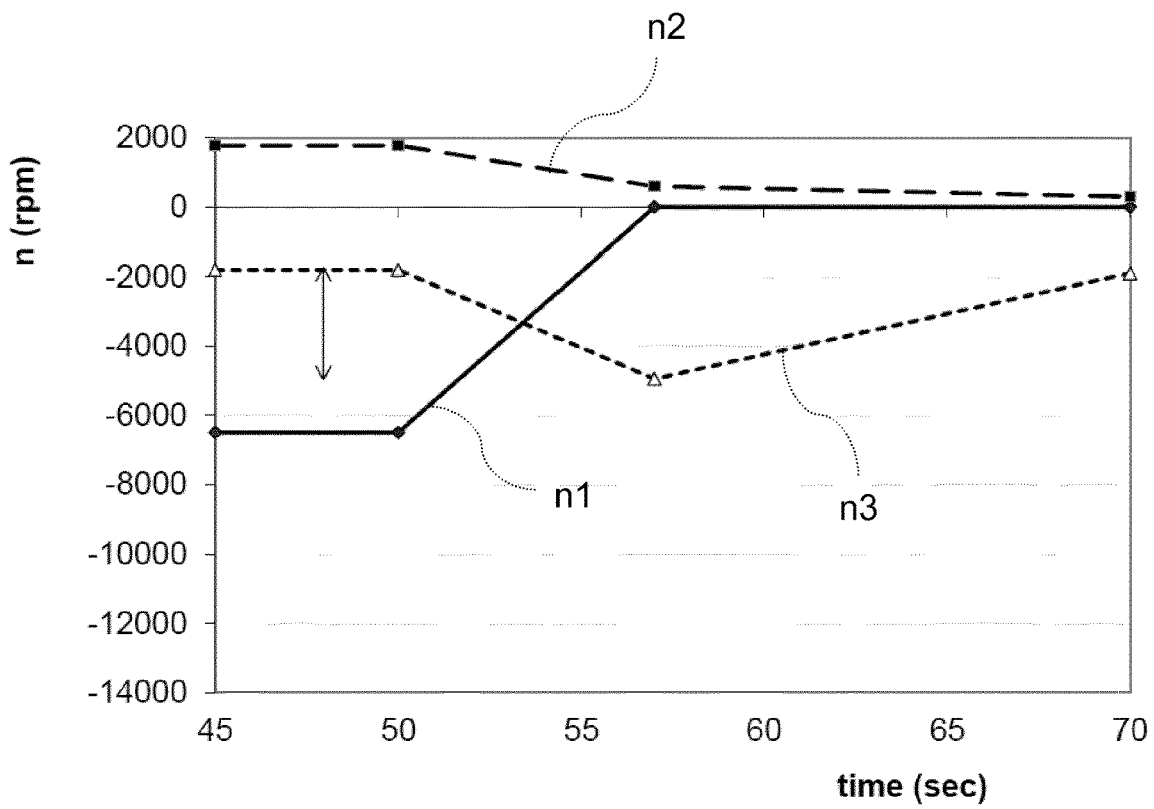
FIG. 4b shows a further exemplary rotational speed profile without closing of the clutch

The rotational speed profiles in FIGS. 4a and 4b schematically show, for a drive device according to the invention, what would occur if the main drive machine 2 were to fail (at the 50 second time point) without the clutch 11.1, 11.2 being closed. Numerical values are merely examples for illustrative purposes, assuming a particular design of the drive device. They may self-evidently vary depending on how the drives 2, 3.1, 3.2, the work machine 1 and the transmission ratios in the transmission 17, 18 are configured.

FIG. 4a illustrates the situation in which, before the onset of the fault situation, the auxiliary drives have been operated with a positive direction of rotation and the work machine 1 has been operated with maximum rotational speed. As a result of the fast drop in rotational speed n1 of the work machine owing to its low inertia and owing to the small drop in the rotational speed n2 of the main drive machine 2 owing to its very high inertia, the auxiliary drives 3.1, 3.2 are initially accelerated in the opposite direction into the negative direction of rotation, and are then accelerated further to high rotational speeds. Here, there is the risk of the auxiliary drive 3.1, 3.2 or planet carrier 10 being damaged owing to inadmissible overspeeding.

FIG. 4b illustrates the opposite situation, in which the auxiliary drives 3.1, 3.2 are operated with negative rotational speed. Here, the work machine 1 runs with a reduced rotational speed n1. In a fault situation (again at the 50 second time point), they are then accelerated to even higher negative rotational speeds. This is again associated with the risk of damage occurring as a result of overspeeding.

Figure 5:
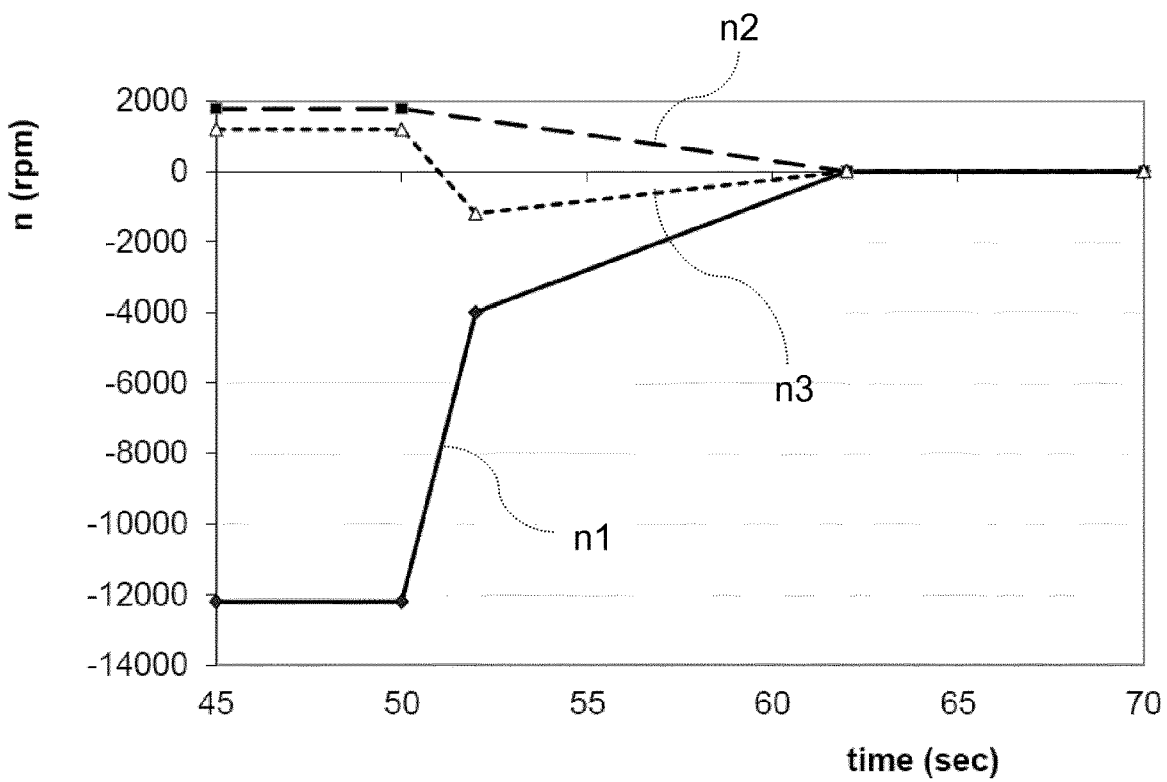
FIG. 5 shows an exemplary rotational speed profile with immediate closing of the clutch

On a device according to the invention, it is now possible by means of the switchable clutch 11.1, 11.2, in a suitable method, to prevent inadmissible overspeeding occurring at the auxiliary drive 3.1, 3.2 or at the planet carrier 10. FIG. 5 shows, by way of example, the rotational speed profiles for the situation in which the clutch 11 is closed immediately after detection of the fault situation (at the 50 second time point). The delay of approximately 2 seconds before the kink results from the initially occurring slippage in the clutch 11.1, 11.2, until the auxiliary drives 3.1, 3.2 are accelerated in the opposite direction. After the kink, it can be seen how the rotational speeds n2 and n3, which are now coupled by the transmission stage 8, 8.1, 19.1, 19.2, 19.3 decrease in a similar manner to zero. In the case of the immediate closing of the clutch 11.1, 11.2, it is necessary for all of the energy to be absorbed in the clutch 11.1, 11.2, which leads to a corresponding temperature increase.

To assist the acceleration of the auxiliary drives in the opposite direction, it is possible, after the detection of the fault situation, for said auxiliary drives to be activated with torque or rotational speed presets. This is however only possible if only the main drive machine has failed or is subjected to a fast shutdown.

Figure 6:
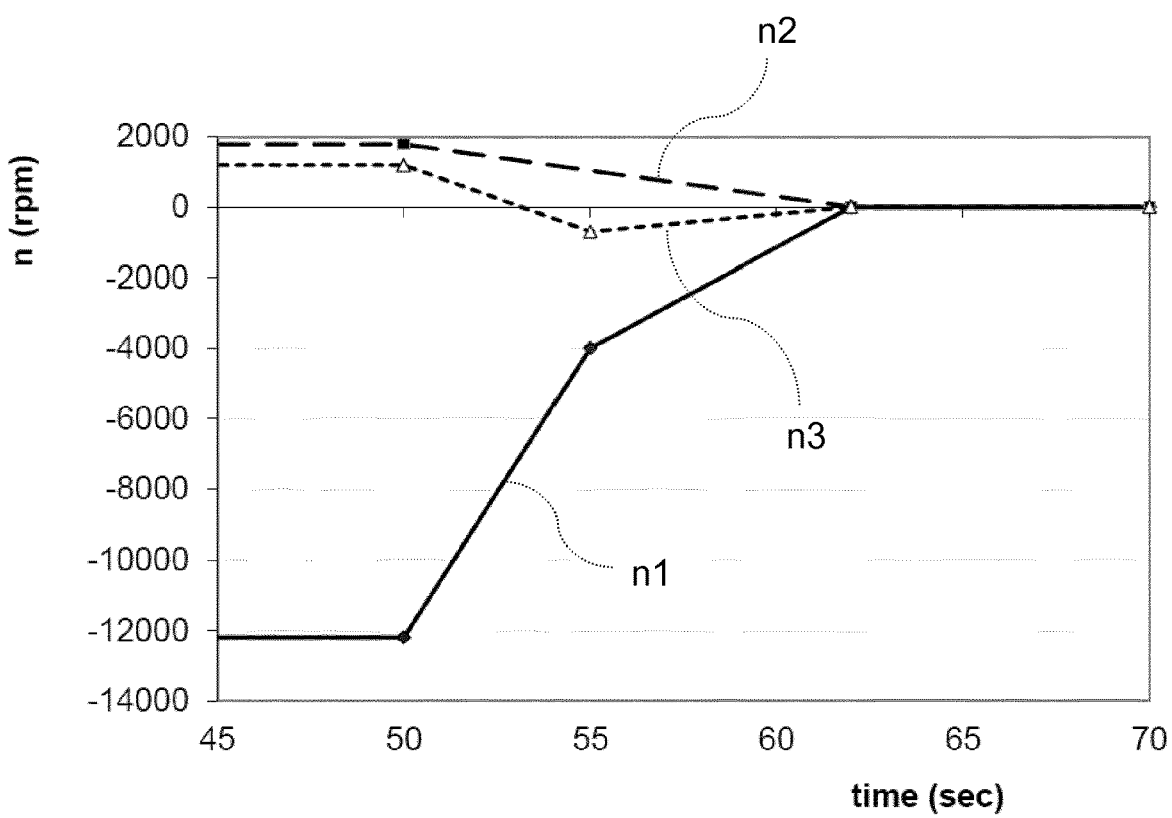
FIG. 6 shows an exemplary rotational speed profile with delayed closing of the clutch

FIG. 6 shows the rotational speed profiles for a further optimized method for rotational speed limitation in the fault situation, in which the clutch 11.1, 11.2 is closed only after a delay and in synchronized fashion. In this way, the required absorption of energy and temperature increase in the clutch 11.1, 11.2 can be limited. For this purpose, the synchronization rotational speed is calculated using Eq. 2 and Eq. 1. Furthermore, the rotational speeds n1, n2 and n3 are measured or determined. If two of these are measured, the third can be determined from the rotational speed equilibrium (Willis equation). It is then possible for the rotational speed profile to be compared with the rotational speed at the synchronization point.

If the rotational speed n3 of the auxiliary drive is moving toward the synchronization rotational speed, then the closing of the clutch 11.1, 11.2 is delayed until the rotational speed n3 has moved into the vicinity of said synchronization rotational speed, for example until said rotational speed deviates from said synchronization rotational speed by at most 5%, preferably at most 3%. Owing to the relatively small rotational speed difference during the closing, it is possible for the temperature increase that occurs here to be limited. In the example shown, the closing has been delayed to such an extent that a full transmission of torque in the clutch 11 occurs for the first time at the 55 second time point.

However, if, upon the detection of the fault situation, the rotational speed n3 of the auxiliary drive is moving away from the synchronization rotational speed, the clutch 11.1, 11.2 is nevertheless immediately closed in order to avoid a further increase of the difference.

It is self-evidently possible for the rotational speed conditions for the closing of the clutch 11.1, 11.2 to also be formulated for the other rotational speeds. Eq. 1 is used for the conversion.

LIST OF REFERENCE DESIGNATIONS

1 Work machine
2 Main drive
3.1, 3.2 Auxiliary drive
4 Internal gear
4.1 Pinion
5 Planet gears
6.1, 6.1a, 6.1b,
6.2, 6.2a, 6.2b First transmission stage
7 Sun gear
8, 8.1 Second transmission stage
9 Housing
   10 Planet carrier
11.1, 11.2 Switchable clutch
12, 13 External cooling arrangement
14 Input shaft
15 Output shaft
16.1, 16.2 Auxiliary drive shafts
16.3, 16.4 Intermediate shaft
17 Superposition transmission
18 Planetary transmission
19.1, 19.2, 19.3 Third transmission stage
20, 21, 22.1, 22.2, 30, 31 Rotational speed sensors
23 Actuator for clutch
24, 26, 28, 32, 33 Winding temperature sensors
25, 27, 29 Bearing temperature sensors
n1 Rotational speed output shaft=sun gear
n2 Rotational speed main drive=internal gear
n3 Rotational speed auxiliary drives
i_PG Transmission ratio planetary transmission (=n1/n2)
i_SG1 Transmission ratio first transmission stage (6.x)
   (=n3/n-planet carrier)
i_SG2 Transmission ratio second transmission stage (8.x)
   (=n2/n3 or =n-intermediate shaft/n-planet carrier)
i_SG3 Transmission ratio third transmission stage (19.x)
   (=n-intermediate shaft/n2)

The invention claimed is:

1. A drive device, comprising:
a main drive machine;
at least one auxiliary drive;
a superposition transmission including an input shaft connected to said main drive machine, an output shaft to be connected to a work machine, a planetary transmission having an internal gear connected to said input shaft, a sun gear connected to said output shaft, a planet carrier and a plurality planet gears;
a first transmission stage with a constant transmission ratio connecting said at least one auxiliary drive to said planet carrier; and
an auxiliary drive connection with a constant transmission ratio having one side disposed at said at least one auxiliary drive and another side disposed at said internal gear or a pinion on said input shaft;
said auxiliary drive connection including a switchable clutch configured to activate or interrupt said auxiliary drive connection, said first transmission stage maintaining an activated connection between said at least one auxiliary drive and said planet carrier upon an occurrence of an interruption; and
an auxiliary drive shaft from which said auxiliary drive connection acts:
through said first transmission stage on said planet carrier;
through a second transmission stage on an intermediate shaft; and
through a third transmission stage on said internal gear or said pinion.

2. The device according to claim 1, wherein said main drive machine is operable only at a constant rotational speed, and said at least one auxiliary drive is operable with rotational speed control.

3. The device according to claim 2, wherein said at least one auxiliary drive is at least one low-voltage motor.

4. The device according to claim 1, wherein said at least one auxiliary drive has at least one respective external cooler constructed as an external fan with a separate fan motor.

5. The device according to claim 4, wherein said external fan has at least one sensor for monitoring a winding temperature at said separate fan motor.

6. The device according to claim 1, wherein said at least one auxiliary drive has at least one respective external cooler.

7. The device according to claim 1, which further comprises an auxiliary drive shaft and a second transmission stage, said auxiliary drive connection acting from said auxiliary drive shaft through said second transmission stage directly on said internal gear or said pinion.

8. The device according to claim 1, wherein at least one of said first transmission stage or said third transmission stage is constructed as a gear train composed of at least two respective gearwheels.

9. The device according to claim 1, wherein said clutch is disposed between said second transmission stage and said third transmission stage.

10. The device according to claim 1, wherein said clutch, in a non-activated state, is configured to move into a closed state upon an occurrence of an energy failure.

11. The device according to claim 10, wherein said clutch is a multiplate clutch or dog clutch or viscous coupling or hydrodynamic clutch.

12. A drive device, comprising:
a main drive machine;
at least one auxiliary drive;
a superposition transmission including an input shaft connected to said main drive machine, an output shaft to be connected to a work machine, a planetary transmission having an internal gear connected to said input shaft, a sun gear connected to said output shaft, a planet carrier and a plurality planet gears;
a first transmission stage with a constant transmission ratio connecting said at least one auxiliary drive to said planet carrier; and
an auxiliary drive connection with a constant transmission ratio having one side disposed at said at least one auxiliary drive and another side disposed at said internal gear or a pinion on said input shaft;
said auxiliary drive connection including a switchable clutch configured to activate or interrupt said auxiliary drive connection, said first transmission stage maintaining an activated connection between said at least one auxiliary drive and said planet carrier upon an occurrence of an interruption; and
at least one of pulse generators disposed on the drive or a rotational speed sensor, for detecting or measuring at least two of three rotational speeds of said main drive machine, said output shaft and said at least one auxiliary drive.

13. A drive device, comprising:
a main drive machine;
at least one auxiliary drive;
a superposition transmission including an input shaft connected to said main drive machine, an output shaft to be connected to a work machine, a planetary transmission having an internal gear connected to said input shaft, a sun gear connected to said output shaft, a planet carrier and a plurality planet gears;
a first transmission stage with a constant transmission ratio connecting said at least one auxiliary drive to said planet carrier; and
an auxiliary drive connection with a constant transmission ratio having one side disposed at said at least one auxiliary drive and another side disposed at said internal gear or a pinion on said input shaft;
said auxiliary drive connection including a switchable clutch configured to activate or interrupt said auxiliary drive connection, said first transmission stage maintaining an activated connection between said at least one auxiliary drive and said planet carrier upon an occurrence of an interruption;
at least one of said at least one auxiliary drive or said main drive machine having at least one of a sensor for detecting a winding temperature or a sensor for detecting a bearing temperature.

14. A method for rotational speed limitation on a drive device, the method comprising the following steps:
providing a drive device including:
a main drive machine;
at least one auxiliary drive;
a superposition transmission including an input shaft connected to the main drive machine, an output shaft to be connected to a work machine, a planetary transmission having an internal gear connected to the input shaft, a sun gear connected to the output shaft, a planet carrier and a plurality planet gears;
a first transmission stage with a constant transmission ratio connecting the at least one auxiliary drive to the planet carrier; and
an auxiliary drive connection with a constant transmission ratio having one side disposed at the at least one auxiliary drive and another side disposed at the internal gear or a pinion on the input shaft, the auxiliary drive connection including a switchable clutch configured to activate or interrupt the auxiliary drive connection, the first transmission stage maintaining an activated connection between the at least one auxiliary drive and the planet carrier upon an occurrence of an interruption; and
upon a failure or fast shutdown of the main drive machine or of an auxiliary drive:
a) detecting the failure or fast shutdown of the main drive machine or of the auxiliary drive; and
s) subsequently closing the clutch.

15. The method according to claim 14, which further comprises additionally carrying out the following steps:
b) repeatedly determining or measuring rotational speeds at one of the auxiliary drives or the planet carrier, at the input shaft or the main drive machine and at the output shaft or the work machine;
c) calculating a synchronization point from a condition in which the rotational speed of the main drive machine before closing the clutch is equal to the rotational speed after closing the clutch;
s1) immediately closing the clutch only if the rotational speed of the auxiliary drive is moving away from the synchronization rotational speed, and
s2) otherwise closing the clutch with a delay when the rotational speed of the auxiliary drive deviates from the synchronization rotational speed at most by 5% or at most by 3%.

16. The method according to claim 14, which further comprises using at least one temperature sensor to monitor upper temperature limits for at least one of a winding temperature or a bearing temperature of the drives to detect an impending failure or fast shutdown of the main drive machine before an onset of the failure or fast shutdown of the main drive machine.

17. The method according to claim 16, which further comprises additionally using present acceleration values from the measured or determined rotational speeds for the detection of the failure or impending failure.

18. The method according to claim 14, which further comprises upon the failure or malfunction of the main drive machine, applying a rotational speed preset or torque preset to the auxiliary drives to bring the auxiliary drives into a vicinity of a synchronization rotational speed.

* * * * *